(12) United States Patent
Dakin et al.

(10) Patent No.: US 8,227,382 B2
(45) Date of Patent: Jul. 24, 2012

(54) BREAKER FLUIDS AND METHODS OF USING THE SAME

(75) Inventors: Eugene Dakin, Katy, TX (US); Andrey Reznichenko, Houston, TX (US); Hui Zhang, Sugar Land, TX (US)

(73) Assignee: M-I L.L.C., Houston, TX (US)

( * ) Notice: Subject to any disclaimer, the term of this patent is extended or adjusted under 35 U.S.C. 154(b) by 147 days.

(21) Appl. No.: 12/745,162

(22) PCT Filed: Nov. 24, 2008

(86) PCT No.: PCT/US2008/084521
§ 371 (c)(1),
(2), (4) Date: May 27, 2010

(87) PCT Pub. No.: WO2009/073438
PCT Pub. Date: Jun. 11, 2009

(65) Prior Publication Data
US 2010/0300967 A1  Dec. 2, 2010

Related U.S. Application Data

(60) Provisional application No. 60/991,362, filed on Nov. 30, 2007, provisional application No. 61/088,878, filed on Aug. 14, 2008.

(51) Int. Cl.
*C09K 8/52* (2006.01)
*C09K 8/584* (2006.01)
*E21B 21/00* (2006.01)
*E21B 37/00* (2006.01)
*E21B 7/00* (2006.01)
*B01D 17/05* (2006.01)

(52) U.S. Cl. .......... 507/203; 166/311; 166/312; 175/57; 175/65; 175/66; 210/708; 507/252; 507/256; 507/259; 507/921; 507/927; 507/935; 516/135

(58) Field of Classification Search ................... 507/203, 507/252, 256, 259, 921, 927, 935; 166/311, 166/312; 175/57, 65, 66; 210/708; 516/135
See application file for complete search history.

(56) References Cited

U.S. PATENT DOCUMENTS

| | | | |
|---|---|---|---|
| 4,662,448 | A | 5/1987 | Ashford et al. |
| 5,888,944 | A | 3/1999 | Patel |
| 5,905,061 | A | 5/1999 | Patel |
| 6,218,342 | B1 | 4/2001 | Patel |
| 6,291,405 | B1 | 9/2001 | Lee et al. |
| 6,325,149 | B1 | 12/2001 | Dobson, Jr. et al. |
| 6,367,548 | B1 | 4/2002 | Purvis et al. |
| 6,422,314 | B1 | 7/2002 | Todd et al. |
| 6,423,326 | B1 * | 7/2002 | Shapiro .................... 424/401 |
| 6,763,888 | B1 | 7/2004 | Harris et al. |
| 6,790,811 | B2 | 9/2004 | Patel |
| 6,790,812 | B2 | 9/2004 | Halliday et al. |
| 6,822,039 | B1 | 11/2004 | Monfreux-Gaillard et al. |
| 6,861,394 | B2 | 3/2005 | Ballard et al. |
| 6,886,635 | B2 | 5/2005 | Hossaini et al. |
| 7,262,152 | B2 | 8/2007 | Monfreux-Gaillard et al. |
| 7,928,039 | B2 | 4/2011 | Monfreux-Gaillard et al. |
| 2006/0223714 | A1 | 10/2006 | Svodoba et al. |
| 2006/0283597 | A1 | 12/2006 | Schriener et al. |
| 2007/0111902 | A1 * | 5/2007 | Patel ........................... 507/246 |
| 2008/0011485 | A1 | 1/2008 | Monfreux-Gaillard et al. |

FOREIGN PATENT DOCUMENTS

| | | |
|---|---|---|
| EP | 566394 A1 | 10/1993 |
| WO | 0123703 A1 | 4/2001 |
| WO | 2008068657 A2 | 6/2008 |

OTHER PUBLICATIONS

International Search Report issued in PCT/US2008/084521, mailed on Jun. 23, 2009, 3 pages.
Written Opinion issued in PCT/US2008/084521, mailed on Jun. 23, 2009, 4 pages.
Office Action issued in corresponding Australian Application No. 2008331603 dated May 10, 2011 (2 pages).
Search Report issued in corresponding European Application No. 08857466.0 dated Sep. 16, 2011 (13 pages).
Office Action issued in corresponding Eurasian Application No. 201000912 dated Dec. 26, 2011 (2 pages).

* cited by examiner

*Primary Examiner* — Timothy J. Kugel
(74) *Attorney, Agent, or Firm* — Osha Liang LLP

(57) ABSTRACT

A method of cleaning a wellbore drilled with a drilling fluid that forms a filter cake that includes emplacing a breaker fluid into the wellbore, the breaker fluid comprising: an aqueous fluid; a fragmentation agent; and an amphoteric chemotrope; and shutting in the well for a period of time sufficient to initiate breaking of the filter cake is disclosed.

33 Claims, No Drawings

BREAKER FLUIDS AND METHODS OF USING THE SAME

BACKGROUND OF INVENTION

1. Field of the Invention

Embodiments disclosed herein relate generally to fluids for use in breaking filter cakes from wellbores. Additionally, embodiments disclosed herein also relate generally to methods of cleaning wellbores.

2. Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

One way of protecting the formation is by forming a filter cake on the surface of the subterranean formation. Filter cakes are formed when particles suspended in a wellbore fluid coat and plug the pores in the subterranean formation such that the filter cake prevents or reduce both the loss of fluids into the formation and the influx of fluids present in the formation. A number of ways of forming filter cakes are known in the art, including the use of bridging particles, cuttings created by the drilling process, polymeric additives, and precipitates. Fluid loss pills may also be used where a viscous pill comprising a polymer may be used to reduce the rate of loss of a wellbore fluid to the formation through its viscosity Upon completion of drilling, the filter cake and/or fluid loss pill may stabilize the wellbore during subsequent completion operations such as placement of a gravel pack in the wellbore. Additionally, during completion operations, when fluid loss is suspected, a fluid loss pill of polymers may be spotted into to reduce or prevent such fluid loss by injection of other completion fluids behind the fluid loss pill to a position within the wellbore which is immediately above a portion of the formation where fluid loss is suspected. Injection of fluids into the wellbore is then stopped, and fluid loss will then move the pill toward the fluid loss location.

After any completion operations have been accomplished, removal of filter cake (formed during drilling and/or completion) remaining on the sidewalls of the wellbore may be necessary. Although filter cake formation and use of fluid loss pills are essential to drilling and completion operations, the barriers can be a significant impediment to the production of hydrocarbon or other fluids from the well if, for example, the rock formation is still plugged by the barrier. Because filter cake is compact, it often adheres strongly to the formation and may not be readily or completely flushed out of the formation by fluid action alone.

The problems of efficient well clean-up and completion are a significant issue in all wells, and especially in open-hole horizontal well completions. The productivity of a well is somewhat dependent on effectively and efficiently removing the filter cake while minimizing the potential of water blocking, plugging, or otherwise damaging the natural flow channels of the formation, as well as those of the completion assembly.

Accordingly, there exists a continuing need for breaker fluids that effectively clean the well bore and do not inhibit the ability of the formation to produce oil or gas once the well is brought into production.

SUMMARY OF INVENTION

In one aspect, embodiments disclosed herein relate to a method of cleaning a wellbore drilled with a drilling fluid that forms a filter cake that includes emplacing a breaker fluid into the wellbore, the breaker fluid comprising: an aqueous fluid; a fragmentation agent; and an amphoteric chemotrope; and shutting in the well for a period of time sufficient to initiate breaking of the filter cake.

In another aspect, embodiments disclosed herein relate to a method for completing a wellbore that includes drilling the wellbore with a drilling fluid to form a filtercake on the walls thereof; gravel packing at least one interval of the wellbore; emplacing a breaker fluid into the wellbore, the breaker fluid comprising: an aqueous fluid; a fragmentation agent; and an amphoteric chemotrope; and shutting in the well for a period of time sufficient to initiate breaking of the filter cake.

In another aspect, embodiments disclosed herein relate to a method for recovering fluids from a wellbore that includes collecting from a wellbore an oil-in-water emulsion comprising: an aqueous fluid as the continuous phase; an oleaginous fluid as the discontinuous phase stabilized by an emulsifier having an HLB greater than 11 and an amphoteric chemotrope; adding to the collected wellbore fluid an additional quantity of the emulsifier having an HLB greater than 11 sufficient to destabilize the emulsion; and separating the collected wellbore fluid in an oleaginous fluid component and an aqueous fluid component.

In yet another aspect, embodiments disclosed herein relate to a method of demulsifying a stabilized oil-in-water emulsion that includes adding to an oil-in-water emulsion comprising a brine continuous phase and an oleaginous discontinuous phase stabilized an emulsifier having an HLB greater than 11 and an amphoteric chemotrope an additional quantity of the emulsifier having an HLB greater than 11 sufficient to destabilize the emulsion.

In yet another aspect, embodiments disclosed herein relate to a method of cleaning a wellbore that includes circulating a displacement fluid through the wellbore, the displacement fluid comprising: a fragmentation agent; and an amphoteric chemotrope.

Other aspects and advantages of the invention will be apparent from the following description and the appended claims.

DETAILED DESCRIPTION

Embodiments disclosed herein relate generally to fluids for use in breaking filter cakes formed on wellbore walls. In particular, embodiments disclosed herein relate generally to methods of and fluids for breaking filter cakes formed on wellbore walls from both oil-based (direct emulsion and invert emulsion) fluids and water-based fluids. Additionally, embodiments disclosed herein also relate generally to methods of recycling returned fluids.

As discussed above, filter cakes are formed on walls of a subterranean borehole (or along the interior of a gravel pack screen, for example) to reduce the permeability of the walls into and out of the formation (or screen). Some filter cakes are formed during the drilling stage to limit losses from the well bore and protect the formation from possible damage by fluids and solids within the well bore, while others are formed from spotted fluid loss pills to similarly reduce or prevent the influx and efflux of fluids across the formation walls. Also reducing the influx and efflux of fluids across a formation wall are fluid loss pills, which prevent such fluid movement by the pills' viscosity. Further, one skilled in the art would appreciate that in addition to a base fluid, the filter cake may also comprise other components such as drill solids, bridging/weighting agents, surfactants, fluid loss control agents, and viscosifying agents as residues left by the drilling fluid or fluid loss pill. Examples of bridging/weighting agents are calcium carbonate, barite, hematite, and manganese oxide, among others.

Breaking of such filter cakes may occur by exposure of the filter cake to a compound having an oleophilic portion that can penetrate into the filter cake to allow for fragmentation of the filter cake. Such compounds may be referred to herein as fragmentation agents. Fragmentation agents may include, for example, fatty acids, derivatives thereof, hydrocarbon solvents, etc. It is postulated that such fragmentation may result because compounds may act by reducing the angle of repose of the filter cake. Lowering the maximum angle of a stable filtercake may occur via any or all of lessening of friction, cohesion and the shapes of the particles. In the case of friction, lower friction will increase the rate of filtercake degradation by lowering the force required between surfaces or fluids in contact with one another. Cohesive properties of the breaker may lessen the intermolecular attraction between like particles or adhesive properties of material which constitutes a given filtercake. Particle shapes may also affect the angle of repose, with a spherical particle having lower friction or cohesive values than a square particle, and a Reuleaux polygon having a friction rating between that of a square and a sphere. Thus, lessening of such properties may result from reaction/interaction of the fragmentation agent with filtercake components such as bridging agents, fluid loss control agents such as starches, etc. However, another theory postulated by the inventors suggests that, when breaking oil-based filter cakes, long hydrocarbon chains of the fragmentation agent, attracted to oleaginous portions of the filter cake between barite or other solid particles, may penetrate into the filter cake between barite particles (due to their attraction to the oleaginous portions of the filter cake) and vibrate due to Brownian motion.

In addition to fragmenting the filter cake, emulsification of oleaginous components may also be required. For example, an oil-based filter cake (formed from drilling with an oil-based mud) may be removed by fluids of the present disclosure via an in situ formation of an oil-in-water emulsion. Conventionally, oil-based muds used in drilling are invert emulsions, that is, water-in-oil emulsions, and remain invert emulsions upon formation of a filter cake. Upon exposure of an invert emulsion filter cake to the breaker fluids of the present disclosure, the emulsion may flip, such that the oleaginous fluid (continuous phase in the invert emulsion) becomes emulsified in an aqueous phase. As used herein, the teen "flip" refers to the changing of an external phase to oil continuous from water continuous, or vice versa. To effectuate such a "flip," the breaker fluid of the present disclosure (or any fluid exposed to filter cake to initiate breaking thereof) may contain at least a fragmentation agent, an emulsifying agent, and an amphoteric chemotrope. The combination of these three components may allow for the breaking of an invert emulsion filter cake and stabilization of an oleaginous fluid into an aqueous fluid (including brine) to form a direct or oil-in-water emulsion. However, as discussed below, in some instances one compound may possess both fragmenting and emulsifying functionalities.

Further, the present disclosure is not only directed to breaking of invert emulsion filter cakes, but rather the filter cakes which may be broken using the breaker fluids of the present disclosure may include filtercakes formed from any type of fluid, including direct emulsions as well as water based fluids. For a filtercake formed from a direct emulsion, upon exposure to the breaker fluids of the present disclosure, the oleaginous fluid (discontinuous phase of a direct emulsion) may be stabilized into the aqueous fluid of the breaker fluid to also form a direct emulsion. Thus, similar to invert emulsions, the breaker fluid may contain at least a fragmentation agent, an emulsifying agent, and an amphoteric chemotrope, where the fragmentation agent and emulsifying agent may be combined into one compound. For water-based fluids, depending on the components within the fluids, there may be some emulsification (oil-in-water) required during the course of breaking a water-based fluid, for example, when using hydrocarbon solvents as the fragmentation agent, as discussed below.

The term "oil-in-water emulsion" refers to emulsions wherein the continuous phase is an aqueous phase and the discontinuous phase is oil, which is dispersed within the continuous phase. When combining the two immiscible fluids (aqueous and oleaginous) without the use of a stabilizing emulsifier, while it is possible to initially disperse or emulsify one fluid within the other, after a period of time, the discontinuous, dispersed fluid droplets coalesce or flocculate, for example, due to the instability of the formed emulsion. Thus, to stabilize the emulsion, an emulsifier may be used. Whether an emulsion turns into a water-in-oil emulsion or an oil-in-water emulsion depends on the volume fraction of both phases and on the type of emulsifier.

Generally, the Bancroft rule applies to the behavior of emulsions: emulsifiers and emulsifying particles tend to promote dispersion of the phase in which they do not dissolve very well; for example, a compound that dissolves better in water than in oil tends to form oil-in-water emulsions (that is they promote the dispersion of oil droplets throughout a continuous phase of water). Emulsifiers are typically amphiphilic. That is, they possess both a hydrophilic portion and a hydrophobic portion. The chemistry and strength of the hydrophilic polar group compared with those of the lipophilic nonpolar group determine whether the emulsion forms as an oil-in-water or water-in-oil emulsion. In particular, emulsifiers may be evaluated based on their HLB value. The term "HLB" (Hydrophilic Lipophilic Balance) refers to the ratio of the hydrophilicity of the polar groups of the surface-active molecules to the hydrophobicity of the lipophilic part of the same molecules. Generally, to form an oil-in-water emulsion, an emulsifier (or a mixture of emulsifiers) having a high HLB, such as greater than 11, may be desirable. In a particular embodiment, the HLB value of the emulsifier may range from 11 to 16.

Further, one skilled in the art would appreciate that any emulsifying agent may be used, including nonionic, cationic or anionic emulsifying agents, as long as a hydrophilic/lipophilic balance sufficient to obtain a stable emulsion of oil into water. Examples of emulsifying agents that may produce an oil-in-water emulsion may include alkyl aryl sulfonates, alkyl sulfonates, alkyl phosphates, alkyl aryl sulfates, fatty acids, ethoxylated amines, ethoxylated phenols, ethoxylated fatty acids, esters, ethers and combinations thereof. Blends of these materials as well as other emulsifiers may also be used for this application. In a particular embodiment, an anionic emulsifier such as alkyl aryl sulfonates, an example of which includes dodecylbenzyl sulfonic acid, may be used as the emulsifier in the breaker fluid to provide for reaction with calcium carbonate in the filter cake. Another embodiment may use fatty acids such as butyric acid (C4), caproic acid (C6), caprylic acid (C8), capric acid (C10), lauric acid (C12), mysristic acid (C14), palmitic acid (C16), stearic acid (C18), etc, in addition to unsaturated fatty acids such as myristoleic acid (C14), palmitoleic acid (C16), oleic acid (C18), linoleic acid (C18), alpha-linoleic acid (C18), erucic acid (C22), etc, or mixtures thereof. In addition to these fatty acids, the compounds may also have a small degree of substitution/branching or may be sulfonic or phosphonic derivatives thereof. Selection of the fatty acid may be based in part on whether the filtercake is largely water-based or oil-based.

Selection among the emulsifying agents may be dependent, for example, on the particular oleaginous fluid to be emulsified (as to the HLB value required to emulsify the fluid), the presence of pH-dependent solutes (and whether solubilization of those solutes is preferable or undesirable), and ability of the emulsifier to act as a fragmentation agent, as discussed above. For example, it may be desirable to solubilize certain salts, which may be present in a filtercake, and thus an ionic emulsifier such as an acidic alkyl aryl sulfonate may be preferable. Further, for a filter cake formed with an oil-based fluid and barite, the emulsifier may preferably have an oleophilic portion that can penetrate into the filter cake to allow for fragmentation of the filter cake.

In a particular embodiment, an acidic alkyl aryl sulfonate, such as dodecylbenzyl sulfonic acid, or similar fatty acids (described above) or fatty acid derivatives (sulfonic or phosphonic acids) may provide such fragmentation ability, in addition to the ability to form an oil-in-water emulsion of the oleaginous portions of the filter cake and solubilize some solutes in the filtercake. However, while acidic alkyl aryl sulfonates may provide for each of fragmentation/penetrability, solute solubilization, and stabilization of oil-in-water emulsions, in other embodiments, multiple compounds may also be used alone or in combination to achieve such desired fragmentation and emulsification. For example, fragmentation/penetrability of a filter cake may be achieved (and/or increased) with the use of hydrocarbon solvents such as d-limonene, hexane, decane, xylene, and other $C_2$-$C_{15}$ hydrocarbon solvents, etc. Thus, when using a fragmentation agent that does not have emulsifying properties, in the case of breaking an oil-based fluid, a separate emulsifier may be used in conjunction with the solvent to form a direct emulsion of the oleaginous components of the filtercake. Similarly, when using such fragmenting solvent in breaking a water-based fluid, a separate emulsifier may be used to emulsify the solvent itself in the water-based breaker fluid.

In addition to fragmentation/penetration of the filter cake, acid solubilization may be aided or achieved with the addition of an acid.

When trying to perform a clean-up operation on a section of the well having high bottom hole pressures (requiring greater hydrostatic pressures to support the bottom hole pressures), it may be desirable to use a brine-based fluid to achieve required hydrostatic pressure. However, in the presence of an aqueous fluid with a high salt content, such as seawater, conventional emulsifying agents will not stabilize the oleaginous portions of the filter cake into an aqueous fluid that contains salts therein. Moreover, when breaking a water based fluid, such instability (or similar instability) also results either from an emulsifier being used to emulsify non-emulsifying fragmentation agent or a fragmentation agent having emulsifying functionality (i.e., in the form of precipitation).

The instability of the oil-in-brine emulsion may be explained by examining the principles of colloid chemistry. The stability of a colloidal dispersion (emulsion for a liquid-liquid dispersion) is determined by the behavior of the surface of the particle via its surface charge and short-range attractive van der Waals forces. Electrostatic repulsion prevents dispersed particles from combining into their most thermodynamically stable state of aggregration into the macroscopic form, thus rendering the dispersions metastable. Emulsions are metastable systems for which phase separation of the oil and water phases represents to the most stable thermodynamic state due to the addition of a surfactant to reduce the interfacial energy between oil and water.

Oil-in-water emulsions are typically stabilized by both electrostatic stabilization (electric double layer between the two phases) and steric stabilization (van der Waals repulsive forces), whereas invert emulsions (water-in-oil) are typically stabilized by only steric stabilization. The addition of salts, however, may result in a reduced electrical double layer. As the double layer decreases, and the distance between two oil droplets is reduced, the oil droplets have more chances to collide with each other and coalesce. Thus, the increase of salt concentration in an emulsion system will increase the electrical conductivity and will in turn destabilize emulsions. Other ways in which salts may potentially destabilize an emulsion include reversible flocculation, irreversible flocculation, change in proton concentrations, etc. Thus, when salts are added to an oil-in-water emulsion stabilized by a conventional emulsifier, the salts, aqueous fluid, and oleaginous fluid are separated into three distinct phases.

However, the use of an emulsifier having a high HLB (or fragmentation agent having high HLB emulsifying functionality) in conjunction with an amphoteric chemotrope may allow for stabilization of the emulsion by formation/stabilization of the double layer(s). As used herein, an amphoteric chemotrope refers to a compound that exhibits dual properties of being amphoteric (a substance that can react as either an acid or a base) and chemotropic (the way in which a substance orients itself in relation to other chemicals). In a particular embodiment, the amphoteric chemotrope may be hydrotropic (the way in which a substance orients itself in relation to water). Use of this class of compounds may allow for the stabilization of an oil-in-brine emulsion that is not otherwise stabilized by a conventional emulsifier. Thus, the amphoteric chemotrope may also be referred to as a co-emulsifier or a brine compatibility agent as a result of its ability to transform an otherwise unstable mixture into a stabilized emulsion.

In a particular embodiment, the amphoteric chemotrope may be a quaternary ammonium compound represented by the formulae below:

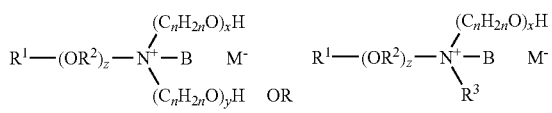

where R1 may be an alkyl or alkenyl group having at least 8 carbons; R2 may be an alkyl group having 2-6 carbon atoms; R3 may be an alkyl group having at least 4 carbons; n may be either 2 or 3; x+y is greater than 5, preferably 5-20; z ranges from 0 to 3; B is hydrogen, an oxyalkyl or alkyl having 1 to 4 carbons, and M is a counter anion, such as a halide. However, one skilled in the art would appreciate that that there may be a balance between the R1/R2 chain and the sum of x+y. That is, if the R1/R2 chain possesses more than 22 carbons, it may be desirable to increase the amount of alkoxylation to greater than 20 so that the compound remains amphiphilic, and vice versa. In particular embodiments, the R1 may be derived from various fatty acids such as butanoic acid (C4), hexanoic acid (C6), octanoic acid (C8), decanoic acid (C10), dodecanoic acid (C12), tetradecanoic acid (C14), hexadecanoic acid (C16), octadecanoic acid (C18), etc.

Further, the counter anions to the quaternaries of the present disclosure may include a variety of counter anions such as the conjugate base to any mineral or strong organic acid, such as halide ion, nitrate ion, sulfate ion, acetate ion, alkyl sulfonate ion, haloalkylsulfonate ions, and the like. Additionally, one skilled in the art would appreciate that additional variations such as substitutions, etc., may exist, so long as they do not alter the nature of the compound to stabilize oil in brine (or to stabilize other chemicals (primary emulsifiers) which stabilize oil in brine).

Examples of suitable amphoteric chemotropes may include quaternary ammonium salts, including quaternary ammonium halides such as chlorides. In a particular embodiment, the amphoteric chemotrope may be an alkoxylated quaternary ammonium chloride (ethoxylated or propoxylated) including quaternary ammonium chlorides derived from fatty amines. Examples of such alkoxylated quaternary ammonium chloride may be isotridecyloxypropyl poly(5) oxyethylene methyl ammonium chloride or coco poly(15) oxyethylene methyl ammonium chloride. Commercial examples of suitable amphoteric chemotrope include Q-17-5 and Q-C-15, which are both ethoxylated quaternary ammonium chlorides, available from Air Products and Chemicals (Allentown, Pa.).

The breaker fluid may contain an aqueous fluid optionally containing salts therein, such as brine or sea water (depending on requirements of a well). For example, the aqueous fluid may be formulated with mixtures of desired salts in fresh water. Such salts may include, but are not limited to alkali metal chlorides, hydroxides, or carboxylates, for example. In various embodiments of the fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, phosphates, silicates, and fluorides. Salts that may be incorporated in a brine include any one or more of those present in natural seawater or any other organic or inorganic dissolved salts. Additionally, brines that may be used in the breaker fluids disclosed herein may be natural or synthetic, with synthetic brines tending to be much simpler in constitution. In a particular embodiment, a brine may include halide or carboxylate salts of mono- or divalent cations of metals, such as cesium, potassium, calcium, zinc, and/or sodium. The density of the breaker fluid may be controlled by increasing the salt concentration in the brine (up to saturation). One skilled in the art would appreciate that such density control may be particularly desirable in order to control bottom hole pressures and/or to prevent (or reduce) movement of a spotted fluid within the wellbore from the section of the wellbore requiring filter cake removal.

The breaker fluid may also optionally contain a mutual solvent, which may aid in blending the emulsifying agent and amphoteric chemotropes into a wellbore fluid and/or increasing the penetrability of the breaker fluid into a filter cake. One skilled in the art would appreciate that by incorporating the agents into the mutual solvent, greater ease in blending the agents in a wellbore fluid may be achieved, as well as decreased viscosity of the formed fluid. However, use of such solvents is optional, and the agents may be incorporated into a breaker fluid without such solvent. However, where increased penetration rate into the filter cake is desired, a mutual solvent may be preferably included to decrease the viscosity of the fluid and increase penetration of the fluid components into the filter cake to cause fragmentation thereof. Conversely, where additional delay is desired, a lesser amount or zero mutual solvent may be included to increase viscosity and thus reduce penetration rate.

One example of a suitable mutual solvent may be a glycol ether or glycerol. In a particular embodiment, the mutual solvent is ethylene glycol monobutyl ether (EGMBE). The use of the term "mutual solvent" includes its ordinary meaning as recognized by those skilled in the art, as having solubility in both aqueous and oleaginous fluids. In some embodiments, the solvent may be substantially completely soluble in each phase while in select other embodiment, a lesser degree of solubilization may be acceptable. Further, in a particular embodiment, selection of a mutual solvent may depend on factors such as the type and amount of salt present in the fluid. For example, in a salt-saturated fluid calcium bromide may have greater compatibility with ethylene glycol monobutyl ether while calcium chloride may have greater compatibility with glycerol. One skilled in the art would appreciate that this difference in compatibility may result from the electronegativity difference between various salts, and the relative ability of the solvent to distribute charges.

As described above, it may be desirable to include an acid source to aid in the solubilization of solutes, as well breaking of some polymeric additives that may be present in a filter cake. In a particular embodiment, it may be desirable to allow for a delay in acid generation. A delayed acid source, as referred to herein, includes compounds which will release acid upon length of time. In particular, compounds that hydrolyze to form acids in situ may be utilized as a delayed acid source. Such delayed source of acidity may be provided, for example, by hydrolysis of an ester. Illustrative examples of such delayed acid sources include hydrolyzable anhydrides of carboxylic acids, hydrolyzable esters of carboxylic acids; hydrolyzable esters of phosphonic acid, hydrolyzable esters of sulfonic acid and other similar hydrolyzable compounds that should be well known to those skilled in the art.

Suitable esters may include carboxylic acid esters so that the time to achieve hydrolysis is predetermined on the known downhole conditions, such as temperature and pH. In a particular embodiment, the delayed acid source may include a formic or acetic acid ester of a C2-C30 alcohol, which may be mono- or polyhydric, such as ethylene glycol monoformate. Other esters that may find use in activating the oxidative breaker of the present disclosure include those releasing C1-C6 carboxylic acids, including hydroxycarboxylic acids formed by the hydrolysis of lactones, such as γ-lactone and δ-lactone). In another embodiment, a hydrolyzable ester of C1 to C6 carboxylic acid and a C2 to C30 poly alcohol, including alkyl orthoesters, may be used. In a particular embodiment, the delayed acid source may be provided in an amount greater than about 1 percent v/v of the wellbore fluid, and ranging from about 1 to 50 percent v/v of the wellbore fluid in yet another aspect. However, one of ordinary skill in the art would appreciate that the preferred amount may vary, for example, on the rate of hydrolysis for the particular acid source used.

Additionally, it may also be desirable to include an oxidant in the breaker fluid, to further aid in breaking or degradation of polymeric additives present in a filter cake. Examples of such oxidants may include any one of those oxidative breakers known in the art to react with polymers such as polysaccharides to reduce the viscosity of polysaccharide-thickened compositions or disrupt filter cakes. Such compounds may include peroxides (including peroxide adducts), other compounds including a peroxy bond such as persulphates, perborates, percarbonates, perphosphates, and persilicates, and other oxidizers such as hypochlorites, which may optionally be encapsulated as taught by U.S. Pat. No. 6,861,394, which is assigned to the present assignee and herein incorporated by reference in its entirety. Further, use of an oxidant in a breaker fluid, in addition to affecting polymeric additives, may also cause fragmentation of swollen clays, such as those that cause bit balling.

The formulation of the fluid may be comprised of (by volume) 0.5-70 percent of amphoteric chemotrope, 10-97.50 percent of the fragmentation agent; 0-50 percent of the emulsifying agent; and 0-50 percent of the acid source. Alternatively, in the case where the fragmentation agent and the emulsifying agent are represented by a single compound (such as an alkyl aryl sulfonate or fatty acid), the formulation of the fluid may be comprised of (by volume) 25-70 percent of amphoteric chemotrope, 10-40 percent of the fragmentation agent; and 0-50 percent of the acid source. In other embodiments, however, a lower concentration of amphoteric chemotrope and emulsifying agent may be sufficient to form an oil-in-brine emulsion so long as a greater amount of amphoteric chemotrope is used as compared to the emulsifying agent. In a particular embodiment, a ratio of 2:1 to 10:1 of amphoteric chemotrope:emulsifier may be desirable. However, one skilled in the art would appreciate that the amount of amphoteric chemotrope necessary depends on the how incompatible the emulsifier is with brine (i.e., type of brine) as well quantity of brine. For example, if the emulsifier is somewhat incompatible with brine, a ratio of 2:1 to 4:1 of amphoteric chemotrope:emulsifier may be sufficient, while a less compatible emulsifier may require a ratio of 3:1 to 10:1 amphoteric chemotrope:emulsifier. Additionally, when a fragmentation agent has less (or no) emulsifying properties, a lower amount of amphoteric chemotrope may be necessary due to the lesser amount of emulsifying agent present in the fluid. Further, depending on the ratios required, it may also be desirable to use a diluent to make the fluid more economical.

One skilled in the art would appreciate that stability of an emulsion may be affected by other factors such as time, temperature, size of the particle and emulsified material. Depending on the requirements of a specific well or desired application, one skilled in the art would appreciate that the breaker fluid may be modified to allow for greater control over the breaking of the filter cake and/or better stabilization of the emulsion formed in situ. Such types of modifications may include breaker fluid properties including such as density and viscosity (to vary penetration and reaction with the filter cake), emulsion component amounts (concentration and ratio), additional surfactants or other additives, etc. For example, as expected downhole temperatures increase, stability of emulsions may decrease. Thus, when such increased temperatures are expected, an additional quantity of an amphoteric chemotrope(s) may be added to increase the ratio of amphoteric chemotrope:emulsifier to maintain stabilization of the emulsion formed in situ.

The breaker fluids of the present disclosure may be emplaced in a wellbore when clean-up/removal of a filter cake is desired. The breaker may be selectively emplaced in the wellbore, for example, by spotting the fluid through a coil tube or by bullheading. A downhole anemometer or similar tool may be used to detect fluid flows downhole that indicate where fluid may be lost to the formation. Various methods of emplacing a pill known in the art are discussed, for example, in U.S. Pat. Nos. 4,662,448, 6,325,149, 6,367,548, 6,790,812, 6,763,888, which are herein incorporated by reference in their entirety. However, no limitation on the techniques by which the breaker fluid of the present disclosure is emplaced is intended on the scope of the present application. In particular embodiments, the use of the fluids may be as a spotting treatment, such as with a fracturing fluid, with a gravel pack, or during other completion operations.

After a period of time sufficient, i.e., several days, to allow for disruption or fragmentation of the filter cake and, optionally, formation of an oil-in-water emulsion in situ, the fluid may be returned to the surface for collection and subsequent recovery techniques. Subsequent washes of the wellbore with wash fluids may be desirable to ensure complete removal of filter cake material remaining therein.

For an emulsified fluid, the collected fluid may be demulsified so that the oleaginous portion may be recovered therefrom and used in further applications, etc. Demulsification of the collected fluid may be achieved by relying on the inability of conventional emulsifiers to stabilize an oil-in-brine emulsion. Thus, to achieve demulsification, a conventional emulsifier, such as those discussed above, and including in a particular embodiment, an alkyl aryl sulfonic acid, may be added to the collected fluid to as to decrease the ratio of amphoteric chemotrope:emulsifier such that the oil-in-water emulsion is destabilized. Destabilization of the emulsion results in aggregation of the phases into their macroscopic form, so that the oleaginous liquid may be collected from the top surface of the collected fluid. Further, to recovery water from the remaining fluid (after removal of the oleaginous fluid), a water clarifier, known to those skilled in the art, may be added to the remaining fluid to achieve settling of solid particles within the fluid so that the water may be separated therefrom. One skilled in the art would appreciate that the recovered water and/or oil may be subjected to further separation/recovery techniques depending on desired uses of the recovered fluids. By demulsifying the fluid, as describe above, the volume of waste (the settled solids) may be reduced significantly as the water and oil may be used in further drilling or other operations.

Further, in some embodiments, the breaker fluids of the present disclosure may be used in wells that have been gravel packed. For example, as known to those skilled in the art, gravel packing involves pumping into the well (and placing in a production interval) a carrier fluid (conventionally a viscoelastic fluid) that contains the necessary amount of gravel to prevent sand from flowing into the wellbore during production. However, filter cake remaining on the walls and the viscoelastic carrier fluid should be removed prior to production. In a particular embodiment, after placement of a gravel pack, a breaker fluid of the present disclosure may be emplaced in the production interval and allowed sufficient time to decrease the viscosity of the viscoelastic carrier fluid and then penetrate and fragment filter cake in the interval, as described above. Alternatively, a wash fluid may be used following the placement of the gravel pack, but prior to the emplacement of the breaker fluid.

Examples of fluids that may be used to drill a wellbore and form a filter cake that may be fragmented and removed in accordance with embodiments of the present disclosure include those fluids such as NOVAPRO™, VERSAPRO™, PARAPRO™, DIPRO™, FAZEPRO™, FLOPRO™ NT, VERSICLEAN™, RHELIANT™, and FAZEPRO™, available from M-I LLC (Houston, Tex.) or those described in U.S. Pat. Nos. 7,262,152, 6,822,039, 6,790,811, 6,218,342, 5,905,061, 6,291,405, and 5,888,944, and U.S. patent application Ser. No. 11/777,399, which are all assigned to the present assignee and herein incorporated by reference in their entirety. However, no limitation on the type of drilling fluid/ filter cake is intended on the scope of the present. Rather, the breaker fluids of the present disclosure may be used to cleanup wellbore drilled within oil-based fluid or a water-based fluid.

When an emulsion is formed, it may include an oleaginous discontinuous phase and an aqueous continuous phase. Aqueous fluids (from either the base fluid of the breaker fluid or the non-oleaginous phase of the invert emulsion filter cake) that may form the continuous phase of the stabilized oil-in-water emulsion may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The oleaginous fluid (from the oleaginous filter cake) that may form the discontinuous phase of the stabilized oil-in-water emulsion may be a liquid, more preferably a natural or synthetic oil, and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof. The concentration of the oleaginous fluid should not be so sufficient that an invert emulsion forms and may be less than about 40% by volume of the emulsion in one embodiment and less than 30% by volume in yet another embodiment. The oleaginous fluid, in one embodiment, may include at least 5% by volume of a material selected from the group including esters, ethers, acetals, dialkylcarbonates, hydrocarbons, and combinations thereof. However, no limitation on the type of oleaginous fluids which may be emulsified is intended by the above list. Rather, the above list includes various oleaginous fluids frequently used in wellbore operations. One of ordinary skill in the art would appreciate that other types of oleaginous fluids may be emulsified in accordance with the present disclosure.

Further, it is also appreciated that the emulsions formed in accordance with the present disclosure may include other components, which may be emulsified or not, depending on the needs and requirements for a particular application, and depending on what components may be found within the filter cake broken by the breaker fluids. Thus, it is specifically within the scope of the present disclosure that other solvents, solids, or gases known to those skilled in the art may be found within the emulsions of the present disclosure.

As described above, the breaker fluid may be circulated in the wellbore during or after the performance of the at least one completion operation. In other embodiments, the breaker fluid may be circulated either after a completion operation or after production of formation fluids has commenced to destroy the integrity of and clean up residual conventional or reversible invert emulsion fluids remaining inside casing or liners.

Generally, a well is often "completed" to allow for the flow of hydrocarbons out of the formation and up to the surface. As used herein, completion processes may include one or more of the strengthening the well hole with casing, evaluating the pressure and temperature of the formation, and installing the proper completion equipment to ensure an efficient flow of hydrocarbons out of the well or in the case of an injector well, to allow for the injection of gas or water. Thus, both injector and producer wells may be treated with the fluids disclosed herein. Completion operations, as used herein, may specifically include open hole completions, conventional perforated completions, sand exclusion completions, permanent completions, multiple zone completions, and drainhole completions, as known in the art. A completed wellbore may contain at least one of a slotted liner, a predrilled liner, a wire wrapped screen, an expandable screen, a sand screen filter, a open hole gravel pack, or casing.

Breaker fluid as disclosed herein may also be used in a cased hole to remove any residual oil based mud left in the hole during any drilling and/or displacement processes. Well casing may consist of a series of metal tubes installed in the freshly drilled hole. Casing serves to strengthen the sides of the well hole, ensure that no oil or natural gas seeps out of the well hole as it is brought to the surface, and to keep other fluids or gases from seeping into the formation through the well. Thus, during displacement operations, typically, when switching from drilling with an oil-based mud to a water-based mud (or vice-versa), the fluid in the wellbore is displaced with a different fluid. For example, an oil-based mud may be displaced by another oil-based displacement to clean the wellbore. The oil-based displacement fluid may be followed with a water-based displacement fluid prior to beginning drilling or production. Conversely, when drilling with a water-based mud, prior to production, the water-based mud may be displacement water-based displacement, followed with an oil-based displacement fluid. In accordance with the present application, the fluids of the present application (having an emulsifier and amphoteric chemotrope therein) may be used between successive displacements to further enhance cleaning of the wellbore, including casing walls, etc, prior to further drilling or production. Specifically, the fluids of the present disclosure may be used to ensure that the wellbore is sufficiently cleaned or that water-wet surfaces become oil-wet, vice-versa, as may potentially be necessary, depending on the subsequent operation. Further, one skilled in the art would appreciate that additional displacement fluids or pills, such as viscous pills, may be used in such displacement or cleaning operations as well, as known in the art.

Another embodiment of the present invention involves a method of cleaning up a well bore drilled with an oil-based drilling fluid, either an invert or direct emulsion, described above. In one such illustrative embodiment, the method involves circulating a breaker fluid disclosed herein in a wellbore, which as been drilled to a larger size (i.e., under reamed) with an oil-based drilling mud, and then shutting in the well for a predetermined amount of time to allow penetration and fragmentation of the filter cake to take place. Upon fragmentation of the filter cake and information in situ of an oil-in-water emulsion, the emulsion can be easily produced from the well bore upon initiation of production and thus the residual drilling fluid is easily washed out of the well bore. Alternatively, a wash fluid (different from the breaker fluid) may be circulated through the wellbore prior to commencing production.

Yet another embodiment of the present invention involves a method of cleaning up a well bore drilled with a water-based drilling fluid, described above. In one such illustrative embodiment, the method involves circulating a breaker fluid disclosed herein in a wellbore and then shutting in the well for a predetermined amount of time to allow penetration and fragmentation of the filter cake to take place. Upon fragmentation of the filter cake, the fluid (and residual filter cake dispersed therein) can be easily produced from the well bore upon initiation of production and thus the residual drilling fluid is easily washed out of the well bore. Alternatively, a wash fluid (different from the breaker fluid) may be circulated through the wellbore prior to commencing production.

Alternatively, if a wellbore that has already begun production of hydrocarbons is believed to be impaired by any residual filter cake left in the well following the drilling operations, a breaker fluid of the present invention may be used to clean the wellbore.

The fluids disclosed herein may also be used in a wellbore where a screen is to be put in place down hole. After a hole is under-reamed to widen the diameter of the hole, drilling string may be removed and replaced with production tubing having a desired sand screen. Alternatively, an expandable tubular sand screen may be expanded in place or a gravel pack may be placed in the well. Breaker fluids may then be placed in the well, and the well is then shut in to allow penetration and fragmentation of the filter cake to take place. Upon fragmentation of the filter cake (and formation in situ of an oil-in-water emulsion when fragmenting oil-based fluids), the fluid/emulsion can be easily produced from the well bore upon initiation of production and thus the residual drilling fluid is easily washed out of the well bore. Alternatively, a wash fluid (different from the breaker fluid) may be circulated through the wellbore prior to commencing production.

However, the breaker fluids disclosed herein may also be used in various embodiments as a displacement fluid and/or a wash fluid. As used herein, a displacement fluid is typically used to physically push another fluid out of the wellbore, and a wash fluid typically contains a surfactant and may be used to physically and chemically remove drilling fluid reside from downhole tubulars. When also used as a displacement fluid, the breaker fluids of the present disclosure may act effectively push or displace the drilling fluid. When also used as a wash fluid, the breaker fluids may assist in physically and/or chemically removing the filter cake once the filter cake has been disaggregated by the breaker system.

In another embodiment, a breaker fluid disclosed herein may be used in the production of hydrocarbons from a formation. Following the drilling of a formation with a drilling mud, at least one completion operation may be performed on the well. A breaker fluid may then be circulated in the well, and the well may be shut for a predetermined time to allow for breaking of the filter cake formed on the walls therein. Formation fluids may then enter the well and production of the formation fluids may ensue. Alternatively, a wash fluid (different from the breaker fluid) may be circulated through the wellbore prior to commencing production of formation fluid.

In some embodiments, circulation of the fluid may be at a controlled pump rate to achieve turbulent or laminar flow so that sufficient exposure/breaking time of the filtercake to the breaker fluid occurs. For example, where either a rapid filter-cake break is desired or maximization of the surface area exposure of a filter cake and breaker, then a turbulent flow wash or the breaker may be introduced at a turbulent flow rate. The transition from a laminar to turbulent flow rate is commonly determined by a Reynolds number value usually greater than 2000. A value below 3000 may have some laminar flow, as a Reynolds number value between 2000 and 3000 is commonly called a transient section, where both laminar and turbulent flow may exist. Conversely, when additional delay or a maximum time for a filter cake break to occur is desired, introduction of the breaker may be introduced with a low flow rate, as low as possible (ASAP) Reynolds number. It is theorized that this spotting procedure may increase the amount of gradients between the filter cake and the fresh spotted fluid similar to a passivation corrosion mechanism where a thin film of intermediate products act as a barrier to limit further reactions.

The following examples are provided to further illustrate the application and the use of the methods and compositions of the present invention.

EXAMPLES

Example 1

Invert Emulsion Drilling Fluid

An invert emulsion fluid was formulated having the following components, all of which are commercially available, as shown below in Table 1. Specifically, the components include SUREMUL®, an amidoamine surfactant, SUREWET®, a wetting agent, VG-PLUS™, an organophilic clay, and SAFECARB®, a calcium carbonate bridging solid, all of which are available from M-I LLC (Houston, Tex.). Filter cakes were created from the fluid using 100 psi differential pressure in an API filter press

TABLE 1

Composition of Laboratory Drilling Fluid to Create Filter Cake for Testing.

| Ingredient | Percent (wt/wt) | Mass (grams) |
|---|---|---|
| IO-1618 base oil | 30.4 | 159.85 |
| Calcium Chloride | 3.8 | 19.95 |
| VG-PLUS ™ | 0.8 | 4.00 |
| SUREMUL ® | 1.5 | 8.00 |
| SUREWET ® | 1.1 | 6.00 |
| Lime | 1.1 | 6.00 |
| SAFECARB ® | 5.7 | 30.00 |
| Water | 9.6 | 50.24 |
| Barite | 46.0 | 240.96 |

Three breaker fluid samples were formulated to determine the return to flow rate of the filter cakes exposed to the breaker fluids for a sufficient period of time to remove the filter cake. The first two breaker fluids formulated represented conventional types of breaker fluids, while the third sample represented an exemplary formulation in accordance with the present disclosure. The breaker fluid samples were formulated having the components shown below in Table 2. Specifically, the components include ECF-974, a hydrolysable ester of formic acid, FAZEMUL™, an acid-sensitive surfactant, ECF-986, a chelating breaker, ECF-1744, a microemulsion, all of which are available from M-I LLC (Houston, Tex.), and Q-17-5, an ethoxylated quaternary ammonium chloride, available from Air Products and Chemicals (Allentown, Pa.).

TABLE 2

Blend Compositions for Return to Flow Test.

| Sample Number | Sample Composition |
|---|---|
| 1 | 131.4 mL 14.2 ppg $CaBr_2$ Brine |
|   | 56.6 mL ECF-974 |
|   | 10.0 mL EGMBE |
|   | 2.0 mL FAZEMUL ™ |
| 2 | 90 mL 14.2 ppg $CaBr_2$ Brine |
|   | 66.4 mL 11.6 ppg $CaCl_2$ Brine |
|   | 20 mL ECF-974 |
|   | 20 mL ECF-986 |
|   | 1 mL ECF-1744 |
|   | 1 mL FAZEMUL ™ |
| 3 | 130 mL 14.2 ppg $CaBr_2$ Brine |
|   | 10 mL EGMBE |
|   | 10 mL DDBSA |
|   | 50 mL ECF-974 |
|   | 10 mL Tomah Q-17-5 |

The initial flow of a filter disk (10 micron) was determined using the base oil IO-1618 at 5 psi in the production direction of the disc. A filter cake was then built on to the filter disk by application of the fluid shown in Table 1 under pressure at 500 psi and 130° F. for 16 hours. The excess drilling fluid was decanted. The cells were each filled with the sample breaker fluids shown in Table 2. A pressure of 500 psi and temperature of 130° F. was applied and the effluent (if any) was collected for 30 min. The cells were then shut, and a soak period was conducted for 93 hours at 130° F. and 50 psig after which the residual breaker was decanted. The return flow of the filter disk (10 micron) was determined by filling the cell with IO-1618 and measuring the return flow at 5 psi in production direction. The percent return flow rate was determined relative to the measured initial flow rate. The results of the Return to Flow Test are shown below in Table 3. As shown in Table 3, the return to flow percentage was significantly higher for Sample 3 than the other two tested samples.

TABLE 3

Return to Flow Results.

| Measurement Description | Sample 1 | Sample 2 | Sample 3 |
|---|---|---|---|
| pH - Initial Breaker | 0.96 | 0.21 | 0.26 |
| pH - Spent Breaker | 1.19 | 0.48 | 1.15 |
| Initial Flow Rate (Raw Data) | 197 mL in 33.54 seconds | 197 mL in 30.91 seconds | 199 mL in 39.69 seconds |
| Initial Flow Rate (Calculated) | 5.8736 mL/sec | 6.3733 mL/sec | 5.0319 mL/sec |
| Final Flow Rate (Raw Data) | 195 mL in 57.61 seconds | 197 mL in 59.25 seconds | 194 mL in 47.79 seconds |
| Final Flow Rate (Calculated) | 3.3848 mL/sec | 3.3249 mL/sec | 4.0594 mL/sec |
| Return to Flow (%) | 57.6 | 52.2 | 81.0 |

Advantageously, embodiments of the present disclosure for at least one of the following. Fluids of the present disclosure may allow for more complete fragmentation of a filter cake, allowing for greater cleanup, as compared to conventional breaker fluids. Specifically, such improvements may result from any of and/or the combination of greater penetrability, solute solubilization, and emulsification of the filter cake components.

The fluid components may be selected for desired properties: whether filter cake removal can be sped up, presence of additional components to aid in degradation of a filter cake including polymeric materials, temperature stability, etc. In particular embodiments using alkyl aryl sulfonic acids such as dodecylbenzylsulfonic acid as the emulsifier, the acid may first react with calcium carbonate present in the fluid to form a calcium complex with the acid, which in turn may also act as an emulsifier to stabilize the oil-in-water emulsion.

As direct oil-in-water emulsions may not be stably formed in a brine or other salt-containing fluid, the breaker fluid of the present disclosure allows for the formation of a stable oil-in-water emulsion in situ during wellbore cleaning operations where an oil-based fluid (and in particular invert emulsion fluids) have been used in drilling the well. By stabilizing such oil-in-brine emulsions, the breaker fluids may possess greater flexibility in hydrostatic pressure (with the use of high density water-based fluids) necessary to support high bottom hole pressures, without risks of aggregation of phases, flocculation, etc. upon breaking of oil-based filter cake. Formation of a stable emulsion is of particular importance when other conditions require a brine-based and/or solids free heavy fluid or when downhole conditions result in a partial emulsion requiring stabilization. Such stabilized direct emulsion wellbore fluid may advantageously be thermodynamically stable, allowing for spontaneous emulsification downhole, whereas formation of emulsions may typically require mixing. Further, as direct emulsions are transparent, it may be easier to determine when a fluid system is overloaded with particles, due to increased opacity due to a Tyndall effect.

Further, the ability to deliver a solvent or oil in a brine system has large economic potential. The ability to formulate an oil phase stably emulsified in a brine may enable variation in bottom hole pressure to allow overbalanced, balanced or underbalanced drilling, which can be modified at the field level. Further, such fluid system may allow for emulsification of oil in situ in a wellbore to remove the oleaginous fluid or delivery of oleaginous materials for various treatment or other purposes downhole, such as breaking a viscoelastic fluid in the case of an open hole gravel pack spotting fluid.

Further, the stabilized oil-in-water emulsions formed in accordance with the present disclosure may also be controllably destabilized or demulsified in accordance with other embodiments disclosed herein. Thus, upon cleaning up a wellbore drilling with an invert emulsion fluid and forming an oil-in-water emulsion in situ, the emulsified breaker fluid may be collected and subjected to recovery techniques. In particular, the collected emulsion may be destabilized to allow for separation of the component phases (oil, water, and solids (from the filter cake) so that component fluids may be reused in further operations, providing greater economic efficiency in addition to waste reduction.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of cleaning a wellbore drilled with a drilling fluid that forms a filter cake, the method comprising:
   emplacing a breaker fluid into the wellbore, the breaker fluid comprising:

an aqueous fluid;
a fragmentation agent; and
an amphoteric chemotrope; and
shutting in the well for a period of time sufficient to initiate breaking of the filter cake.

2. The method of claim 1, wherein the breaker fluid further comprises:
an emulsifier having a hydrophilic lipophilic balance of greater than 11.

3. The method of claim 1, wherein the fragmentation agent has a hydrophilic lipophilic balance of greater than 11.

4. The method of claim 1, further comprising:
collecting the breaker fluid having at least a portion of the broken filter cake emulsified therein.

5. The method of claim 1, further comprising:
circulating a wash fluid through the wellbore.

6. The method of claim 1, further comprising:
initiating production of formation fluids through the wellbore.

7. The method of claim 1, further comprising:
performing at least one completion operation in the wellbore.

8. The method of claim 1, where in the breaker fluid further comprises a mutual solvent, a hydrocarbon solvent, a delayed acid source, an oxidant, or combinations thereof.

9. The method of claim 1, wherein the fragmentation agent comprises an alkyl aryl sulfonic acid, a $C_4$-$C_{22}$ fatty acid, derivatives thereof, or combinations thereof.

10. The method of claim 1, wherein the amphoteric chemotrope comprises an alkoxylated quaternary ammonium chloride.

11. The method of claim 1, wherein the aqueous fluid comprises salts therein.

12. A method for completing a wellbore, comprising:
drilling the wellbore with a drilling fluid to form a filtercake on the walls thereof;
gravel packing at least one interval of the wellbore;
emplacing a breaker fluid into the wellbore, the breaker fluid comprising:
an aqueous fluid;
a fragmentation agent; and
an amphoteric chemotrope; and
shutting in the well for a period of time sufficient to initiate breaking of the filter cake.

13. The method of claim 12, wherein the breaker fluid further comprises:
an emulsifier having a hydrophilic lipophilic balance of greater than 11.

14. The method of claim 12, wherein the fragmentation agent has a hydrophilic lipophilic balance of greater than 11.

15. The method of claim 12, further comprising:
circulating a wash fluid through the wellbore prior to and/or after emplacing a breaker fluid.

16. The method of claim 12, further comprising:
collecting the breaker fluid having at least a portion of the broken invert emulsion filter cake emulsified therein.

17. The method of claim 12, further comprising:
initiating production of formation fluids through the wellbore.

18. The method of claim 12, where in the breaker fluid further comprises a mutual solvent, a hydrocarbon solvent, a delayed acid source, an oxidant, and combinations thereof.

19. The method of claim 12, wherein the fragmentation agent comprises an alkyl aryl sulfonic acid, a $C_4$-$C_{22}$ fatty acid, derivatives thereof, or combinations thereof.

20. The method of claim 12, wherein the amphoteric chemotrope comprises an alkoxylated quaternary ammonium chloride.

21. A method for recovering fluids from a wellbore, comprising:
collecting from a wellbore an oil-in-water emulsion comprising:
an aqueous fluid as the continuous phase;
an oleaginous fluid as the discontinuous phase stabilized by an emulsifier having hydrophilic lipophilic balance of greater than 11 and an amphoteric chemotrope;
adding to the collected wellbore fluid an additional quantity of the emulsifier having a hydrophilic lipophilic balance of greater than 11 sufficient to destabilize the emulsion; and
separating the collected wellbore fluid into an oleaginous fluid component and an aqueous fluid component.

22. The method of claim 21, further comprising:
separating out any solid particulates from the aqueous component.

23. The method of claim 21, further comprising:
reusing a portion of one of the oleaginous component, the aqueous component, and combinations thereof.

24. The method of claim 21, wherein the emulsifier comprises an alkyl aryl sulfonic acid, a $C_4$-$C_{22}$ fatty acid, derivatives thereof, or combinations thereof.

25. The method of claim 21, wherein the amphoteric chemotrope comprises an alkoxylated quaternary ammonium chloride.

26. The method of claim 21, wherein the additional quantity of emulsifier is blended with a mutual solvent.

27. The method of claim 21, wherein the additional quantity of emulsifier in combination with the emulsifier in the wellbore fluid is greater than the amount of amphoteric chemotrope.

28. A method of demulsifying a stabilized oil-in-water emulsion, comprising:
adding to an oil-in-water emulsion comprising a brine continuous phase and an oleaginous discontinuous phase stabilized by an emulsifier having a hydrophilic lipophilic balance of greater than 11 and an amphoteric chemotrope an additional quantity of the emulsifier having a hydrophilic lipophilic balance of greater than 11 sufficient to destabilize the emulsion.

29. The method of claim 28, wherein the emulsifier comprises an alkyl aryl sulfonic acid, a $C_4$-$C_{22}$ fatty acid, derivatives thereof, or combinations thereof.

30. The method of claim 28, wherein the amphoteric chemotrope comprises an alkoxylated quaternary ammonium chloride.

31. The method of claim 28, wherein the additional quantity of emulsifier is blended with a mutual solvent.

32. The method of claim 28, wherein the additional quantity of emulsifier in combination with the emulsifier in the wellbore fluid is greater than the amount of amphoteric chemotrope.

33. A method of cleaning a wellbore, comprising:
circulating a displacement fluid through the wellbore, the displacement fluid comprising:
a fragmentation agent;
an amphoteric chemotrope.

* * * * *